United States Patent
Hosking et al.

(10) Patent No.: US 8,082,318 B2
(45) Date of Patent: Dec. 20, 2011

(54) CONTROLLING SERVICE REQUESTS TRANSMITTED FROM A CLIENT TO A SERVER

(75) Inventors: Michael R Hosking, Ipswich (GB); Simon A Beddus, Ipswich (GB); Patrick B Farley, Ipswich (GB); David Roxburgh, Woodbridge (GB)

(73) Assignee: British Telecommunications PLC, London (GB)

( * ) Notice: Subject to any disclaimer, the term of this patent is extended or adjusted under 35 U.S.C. 154(b) by 512 days.

(21) Appl. No.: 10/488,777

(22) PCT Filed: Aug. 30, 2002

(86) PCT No.: PCT/GB02/03981
§ 371 (c)(1),
(2), (4) Date: Mar. 5, 2004

(87) PCT Pub. No.: WO03/029975
PCT Pub. Date: Apr. 10, 2003

(65) Prior Publication Data
US 2004/0249944 A1    Dec. 9, 2004

(30) Foreign Application Priority Data
Sep. 28, 2001 (EP) .................................. 01308317

(51) Int. Cl.
*G06F 15/16* (2006.01)
(52) U.S. Cl. ........ 709/217; 709/218; 709/219; 709/223; 709/225
(58) Field of Classification Search .......... 709/217–219, 709/223, 225
See application file for complete search history.

(56) References Cited

U.S. PATENT DOCUMENTS

| | | | | |
|---|---|---|---|---|
| 5,280,470 A | * | 1/1994 | Buhrke et al. | 370/232 |
| 5,734,825 A | * | 3/1998 | Lauck et al. | 709/233 |
| 6,014,707 A | * | 1/2000 | Miller et al. | 709/232 |
| 6,374,362 B1 | * | 4/2002 | Ohtsu | 714/4.1 |
| 6,549,934 B1 | * | 4/2003 | Peterson et al. | 709/203 |
| 6,662,230 B1 | * | 12/2003 | Eichstaedt et al. | 709/229 |
| 6,851,062 B2 | * | 2/2005 | Hartmann et al. | 726/22 |
| 7,146,417 B1 | * | 12/2006 | Coile et al. | 709/224 |
| 7,171,483 B2 | * | 1/2007 | Klein | 709/232 |

(Continued)

FOREIGN PATENT DOCUMENTS
EP    0384339 A2    8/1990

(Continued)

OTHER PUBLICATIONS

Li et al., "A Measurement-Based Admission-Controlled Web Server", Proceedings IEEE INFOCOM 2000. The Conference on Computer Communications, 19th . Annual Joint Conference of the IEEE Computer andCommunications Societies. Tel Aviv, Israel, Mar. 26-30, 2000, Proceedings IEEE INFOCOM. The Conference on Computer Commu, vol. 2 of 3, Conf. 19, Mar. 26, 2000, pp. 651-659, XP001042779.

(Continued)

*Primary Examiner* — Mohamed Wasel
(74) *Attorney, Agent, or Firm* — Nixon & Vanderhye PC (57) ABSTRACT

A method and system for controlling service requests from a client to a server involves intercepting and controlling the transmission of service requests from the client to the server. The service requests are queued at the client and the transmission of the queued service requests are delayed to smooth the frequency of service requests transmitted to the server.

24 Claims, 6 Drawing Sheets

U.S. PATENT DOCUMENTS

| | | |
|---|---|---|
| 7,305,431 B2 * | 12/2007 | Karnik et al. ............... 709/203 |
| 2002/0103846 A1 * | 8/2002 | Zisapel et al. ............... 709/105 |
| 2003/0220968 A1 * | 11/2003 | Hickson et al. ............... 709/203 |
| 2004/0073634 A1 * | 4/2004 | Haghpassand ............... 709/220 |
| 2004/0143670 A1 * | 7/2004 | Roychowdhury et al. .... 709/229 |
| 2006/0031420 A1 * | 2/2006 | Ferguson et al. ............ 709/219 |
| 2006/0047751 A1 * | 3/2006 | Chen et al. ................... 709/205 |
| 2007/0088826 A1 * | 4/2007 | Raphel et al. ................. 709/225 |
| 2008/0307219 A1 * | 12/2008 | Karandikar .................. 713/153 |

FOREIGN PATENT DOCUMENTS

| | | |
|---|---|---|
| EP | 0936544 A2 | 8/1999 |
| EP | 1081917 A2 | 3/2001 |
| EP | 1093054 A1 | 4/2001 |
| WO | WO 00/68817 | 11/2000 |
| WO | WO 00/74338 A2 | 12/2000 |

OTHER PUBLICATIONS

Grasso, "Implementing Interposition in CORBA Object Transaction Service", Enterprise Distributed Object Computing Workshop Y1997. Proceedings, First International Gold Coast, QLD., Australia Oct. 24-26, 1997, Los Alamitos, CA, USA, IEEE Comput. Soc. US, Oct. 24, 1997, pp. 184-189, XP010251297.

* cited by examiner

CONTROLLING SERVICE REQUESTS TRANSMITTED FROM A CLIENT TO A SERVER

This application is the US national phase of international application PCT/GB02/03981 filed 30 Aug. 2002 which designated the U.S. and claims benefit of EP 01308317.5, dated 28 Sep. 2001, the entire content of which is hereby incorporated by reference.

BACKGROUND

1. Technical Field

The invention relates to an improved client server model, in particular a computer system comprising a server module and a client module.

2. Related Art

The client-server model of computing is used throughout the computing industry for accessing shared server side capabilities such as print queues, network devices and directories.

To date the client-server model has been primarily used within intranets and extranets in particular in between parties that are well known to each other and have a high degree of trust in one another. Part of this trust relies on the client refraining from the service through overusing finite server side capabilities. As the model is taken up further in more open programming environments in the Internet for instance it becomes even more crucial to protect server based computing resources through intelligently applied measures.

The overuse of these capabilities can comprise simple congestion difficulties but can extend to malicious causes such as denial of service attacks. Existing solutions include over provision of front end servers and/or forced disconnection of overuse clients. However this approach is very costly both in hardware and software resources and provides only abrupt reduction in incoming traffic. Agreements with users can be enforced but often only after the event and through the courts. Alternatively, certain server systems enable the service to notify the clients of service outages or congestion. However this is once again reactive and relies firstly on client recognition and secondly client reaction, neither of which can be guaranteed.

Figure 1:
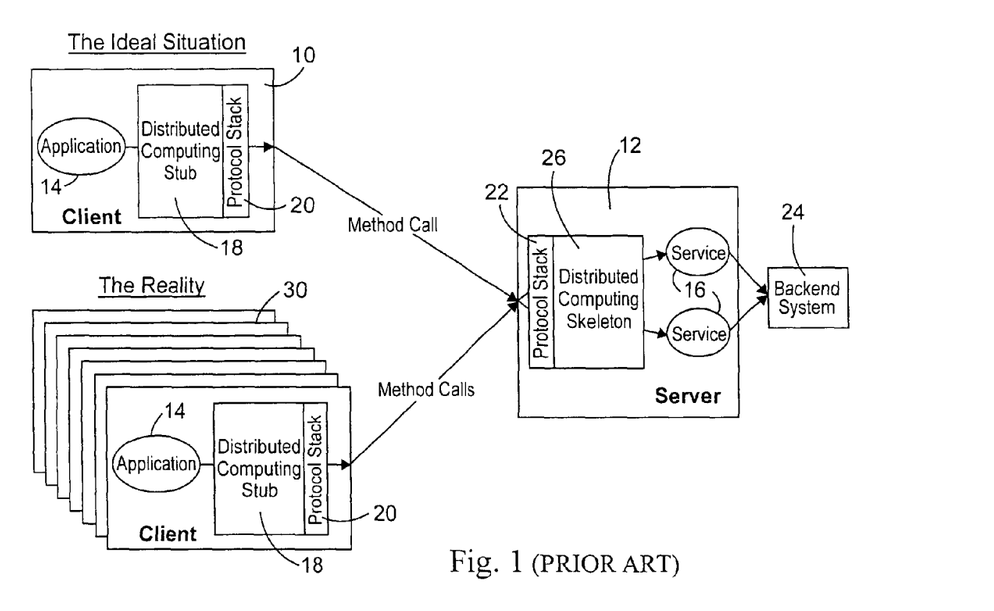
FIG. 1 shows a client server system in a known arrangement.

One known example of a client server system is shown in FIG. 1. FIG. 1 shows a system including an ideal client 10 and real client 30 communicating with a server 12. An application 14 makes a method call to services 16 running on the server 12 through a distributed computing stub 18. The stub 18 is used to make the service 16 appear local to the application 14. Calls including to methods, functions and parameters are passed into the stub 18 and are marshalled and then serialized such that they may be conveyed to the server 12 using a client protocol stack 20. At the server end this data is pulled off the wire by the server protocol stack 22 and is then de-serialized and unmarshalled back via a distributed computing skeleton 26 into a method or function call that is passed to the service 16. The service 16 will perform actions and may call upon other services running operating backend systems 24. Return values from the service 16 are similarly processed and sent back to the calling stub 18 and then on to the application 14. In, for example, a Java RMI-based distributed computing system the client application accesses a service capability stub by doing a "lookup" to download the service capability stub to the client system. The stub provides all the marshalling and un-marshalling capabilities to communicate method calls to the server capability. The client application 14 then calls a given method on the stub 18, this method is then marshalled into a message that is transmitted to the server 12 which un-marshals the message back into the method call which is applied to the server capability object. This object performs tasks and then returns a value through the stub back to the calling client application 14.

A problem with this design is that when applications operate normally or obey a Service Level Agreement (SLA), then the calls from a single client or in a more realistic situation multiple clients 30 will not exceed the capability of the server 12. In most enterprises the problem is managed by careful construction and deployment of client applications 12 combined with over-provisioned server capacity. Although clustering and the use of special clustering stubs can distribute the load over multiple servers, it does not overcome the basic problem of client demand outstripping server capacity. When demand does outstrip capacity the server may become impossibly slow, gives rise to failed transactions and dropped connections and eventually the service and server may die completely. In most cases it will be the peak traffic demand that will knock out the server rather than the average traffic.

BRIEF SUMMARY

Various advantages arise from the exemplary embodiment of the invention. Firstly use of the control intermediary allows controls to be applied in real-time to the service rather than relying on agreements that may be breached. Controlling the service requests using information supplied by the server will result in more efficient usage of server resources and give the application programmer interface (API) operator better control of load on the service. Pre-emptive load control measures can be applied to clients as for instance before a busy period, allowing the API operator to better manage service levels for the service clients. As a result, if an instance of the network platform becomes too busy or a service becomes unavailable, the client can be rerouted to another instance of the platform. Because a transparent initialisation sequence is provided third party applications will be simpler to implement and there is less reliance on the third party application developer to factor in responsible service request control mechanisms. Accordingly service level agreement (SLA) provision is provided in client server systems. Polling of the server by the request manager provides a heartbeat mechanism for both client and server health. In addition the system allows individual denial of service attacks to be identified and dealt with before firewall and packet filter mechanisms are applied.

BRIEF DESCRIPTION OF THE DRAWINGS

Embodiments of the invention will now be described, by way of example, with reference to the drawings of which.

DETAILED DESCRIPTION OF EXEMPLARY EMBODIMENTS

In overview, the solution that is offered by this invention is to delay and effectively queue up method calls on the client such that traffic sent to the server is smoothed out. The invention is applicable to any appropriate distributed application but is discussed below with regard to Java systems. In particular, referring to FIG. 2, a service 16 on a server 12 has one or more methods which are called by the client application 14 via a distributed computing stub 18 at the client 10 comprising a client interface for a class of objects. On the server side the distributed computing skeleton 26 routes method calls to the object implementation at the server 16.

According to the exemplary embodiment a client is effectively allowed a calling rate of say X method calls per minute/hour/day as required, the thread calling the server 12 goes into the stub 18, but before marshalling begins the thread calls intercept on an Integrity Management Client (IMC) 32. The IMC 32 can look at the method name, caller, object name etc and decide to hold back the thread of execution by waiting for a predetermined time, termed "throttling back". Once this wait is complete, the thread is released to continue with the invocation of the service on the server. In the embodiment shown in FIG. 2 the delay period is generated using static information local to the client.

Figure 3:
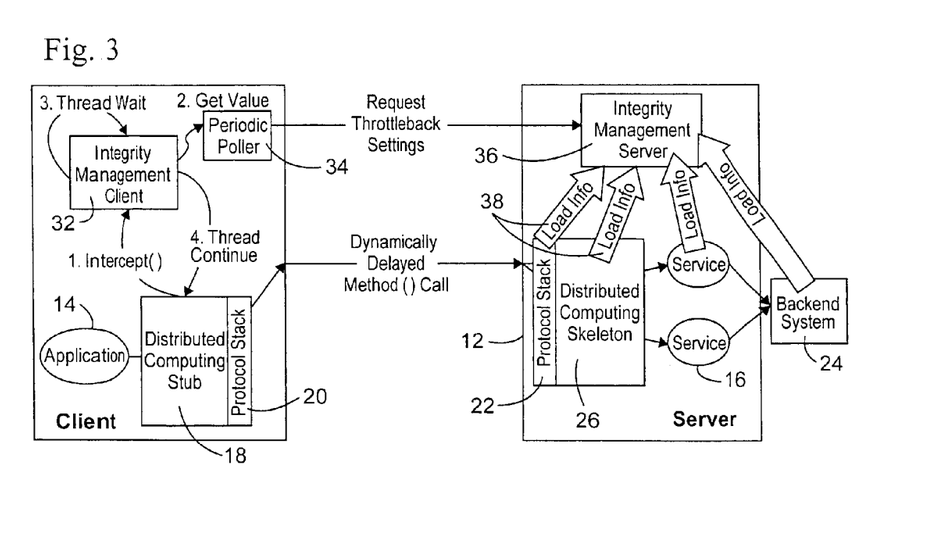
FIG. 3 shows a client server system according to a further embodiment of the invention.

In the embodiment shown in FIG. 3 the server 12 sends throttle back information to the IMC 32 via a periodic poller client 34. The poller client 34 calls "get value" to an Integrity Manager Server (IMS) 36 on the server 12 that returns throttleback settings and other information to do with service availability, expected shutdown times etc. This polling action is termed a "heart beat". The IMS can take information 38 from the skeleton 26, service 16 load, user load, server 12 infrastructure and other system load information to calculate throttleback settings according to a predetermined algorithm, or can obtain a direct throttleback delay value from the polled information. The system is such that individual services 16 can be throttled back whilst others run free or general throttleback can be applied to all services.

In this preferred version the delay period of the method call is dynamic generated using static information local to the client and dynamic information available to the server. The periodic polling rate of the client can itself be updated dynamically such that it does not flood the IMSS 36 with unnecessary requests. Client and the server can also use the polling mechanism to check that each other are alive. The IMSS can be installed on the same server as the service or any other depending on the demands of the installation.

A second implementation of the invention is to offer SLA management that allows differential services to application developers based on the level of service. In that embodiment different users can be given different service levels. This is achieved through extending the IMS generation of calling rate values dependent upon user Id. When the peroidic poller connects to the IMS, the IMS can get the ID of the user from the server context information. Where this information does not exist, a user Id parameter can be added in the heartbeat message from the IMSC to the IMS so that user may be identified. SLA management may allow "User A" a method call rate of 1 call per 300 ms, whilst "User B" is allowed a method call rate of 1 call per 150 ms. Safe guards are employed within the IMS to ensure that users do not connect more than one client to the server or if they do the method call rates calculated by the IMS are set accordingly.

Figure 4:
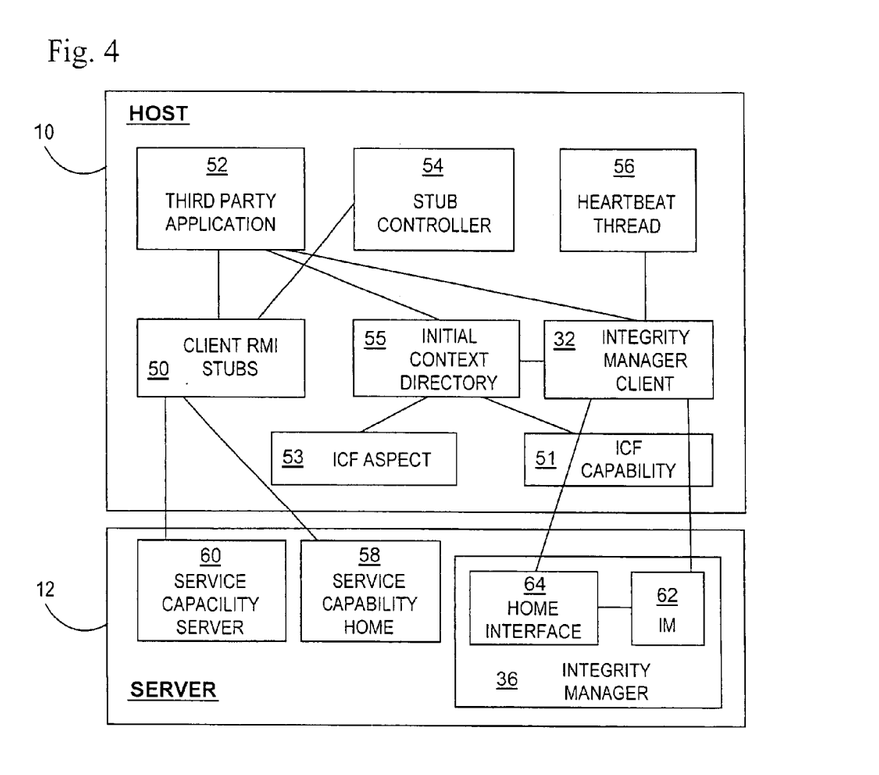
FIG. 4 shows a more detailed client server model according to the invention.

Turning now to a more detailed description with reference to FIG. 4, the system is implemented by using the Java 2 Enterprise Edition (J2EE) based client server system but could equally be applied to .NET, CORBA, DCOM, SOAP, Parlay and JAIN technologies as discussed in more detail below. The skilled person will be familiar with these systems and associated terms such as Enterprise Java Bean (EJB) which is not, therefore, described in detail below.

A third party client application 52 runs on a host 10 that includes a memory for storing software, computer readable code, and software modules and which is remote to the server 12 that provides the service capabilities (single or multiple object components running on the server) that the client needs. The Client Application 52 can be any appropriate application written by the user. The client accesses these service capabilities through authentication and access control mechanisms operated by the service provider. The computer readable code, software, and software modules can be stored on a computer readable storage medium such as a hard disk, CD-ROM, or the like. As part of the service level agreement that exists between the client business and the service provider is that a Software Development Kit (SDK) that contains special communication capabilities must be downloaded and installed on the client system. The client side components are installed through the Software Development Kit in the form or a downloadable zip or tar file. These aspects will be familiar to the skilled reader and are therefore not discussed further here. However, the special client side components shown in FIG. 4 allow the service provider to be polled for throttleback settings. The client stubs 50 interact with the client side components to cut back or delay invocations of methods on the various service capabilities running on the server 12 as mentioned above.

The Service Capability Stub 50 is a doctored Remote Method Invocation (RMI) stub which is a client side object that acts as a proxy to marshal and un-marshal values that are sent to and received from the server 12. RMI stubs are classes that are generated by the use of tools such as Javasoft's RMIC when building server side components.

The Integrity Manager Client's 32 primary job is to request and store throttleback settings from the Integrity Manager Server 36 in a repository. A stub controller 54 is responsible for managing the throttling back of methods for the various service capabilities. It accesses the throttleback settings from the IMC 32. A Heartbeat thread (MBT) 56 polls the IMC periodically to call "heartbeat" information, discussed in more detail below, from an Integrity Manager in the server 12. When a method is called on the service capability, it checks the appropriate stub controller. If necessary the stub controller will delay or reject the thread before accessing the underlying service capability. In the following discussion references to IMS, IMSS and server side IM all refer to the server side integrity manager, and references to IMC, IMSC refer to the client side integrity manager.

Turning to the server side, a Service Capability Home 58 represents a manager class for the service capability which is part of the J2EE specification allowing access to further relevant software components. In one embodiment (not shown) the home 58 could itself be throttled back as it is a remote object.

The Service Capability stored on a service capability server 60 represents an individual service that the customer uses. In the exemplary embodiment it has a method "aMethod". Associated with the service capability is the client side stub 50 that is downloaded automatically when a client does lookup of the object or a reference is passed back to the client through some other mechanism. This automatic download ensures that throttleback is installed prior to access being available to the service.

The Integrity Manager (IM) Server Side 62 represents a manager that is responsible for calculating throttleback information to Integrity Manager Clients. In this case it is shown as an Enterprise Java Bean (EJB) and thus includes a home interface 64 for accessing it, all hosted on the IMS 36.

The server side components are operated by the service provider and are made accessible through a Java RMI interface/Enterprise Java Bean programming model. For simplicity of illustration this invention does not reveal the remote interfaces, remote objects, stubs, skeletons, authentication and access control mechanisms that are standard with application servers unless they feature specifically in the invention.

Figure 2:
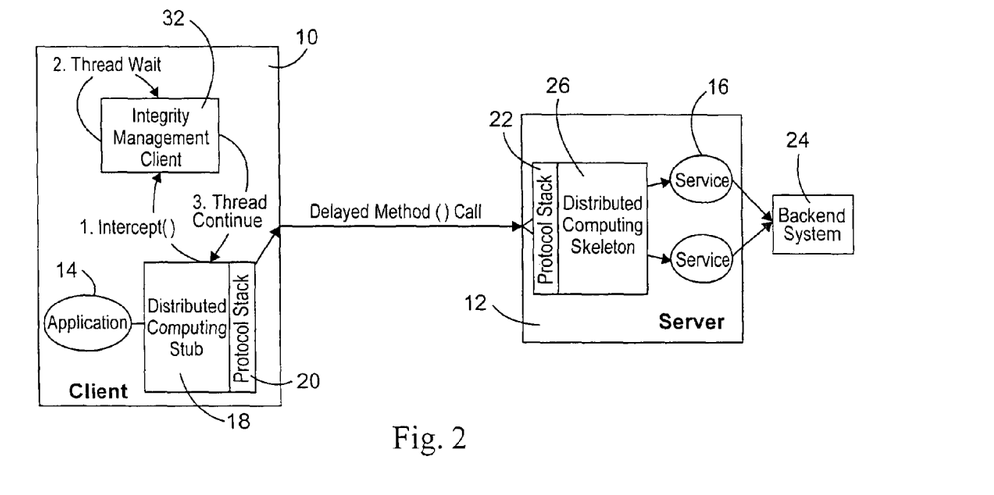
FIG. 2 shows a client server system according to the invention.

The first stage of use of the invention is initialization. A simple version of initialization of the client-server is illustrated in FIGS. 2, 4 and the flow chart of FIG. 5. This describes the scenario where an example application 14 attempts to access a service 16 capability on the server 12. Before the example application 14 can do this the client application must initialize special client side components. Initialization is mandatory for all clients, failure to do so will result in future calls to the server being blocked.

Figure 5:
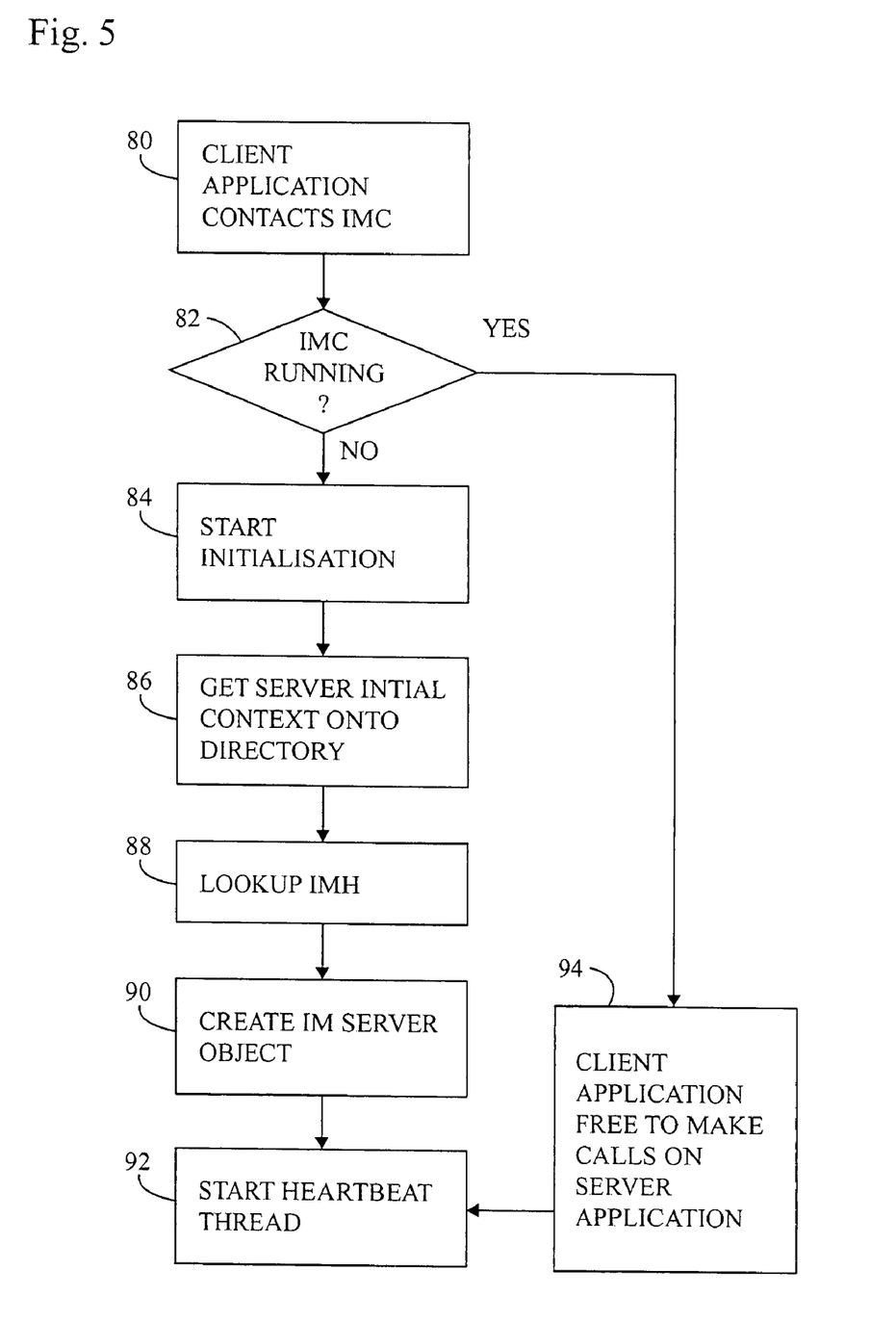
FIG. 5 is a flow diagram of initialisation of the client server system according to the invention.

Initialization is performed as follows. At step 80 the client application 14 attempts to contact the local Integrity Manager Client 32. If one is not already running, at step 82 the application 14 will be notified by a null return and the application must then start the initialization process at step 84 by calling an appropriate routine. The new IMC 32, creates a new context allowing a directory lookup at step 86 for components running on the server 12 to get the server initial context onto the directory. The IMC 32 then performs a lookup for the Integrity Manager Home (IMH) object 64 on the server 12 (step 88). For authentication purposes, the user may need to include principal and credential information to create the context. The IMC 32 then creates a server object (step 90) through accessing the IMH 64 with an appropriate method. The IMC 32 will now have a reference to the Integrity Manager (IM) server 36 instance for future reference. At this point 92 the IMC 32 will then start the Heartbeat Thread (HBT) 56 passing its self as parameter. The client application is ow free to make calls on the server (step 94). Once the HBT 56 has been initialized it will run continuously, polling the IMC until the client application is stopped.

Figure 6:
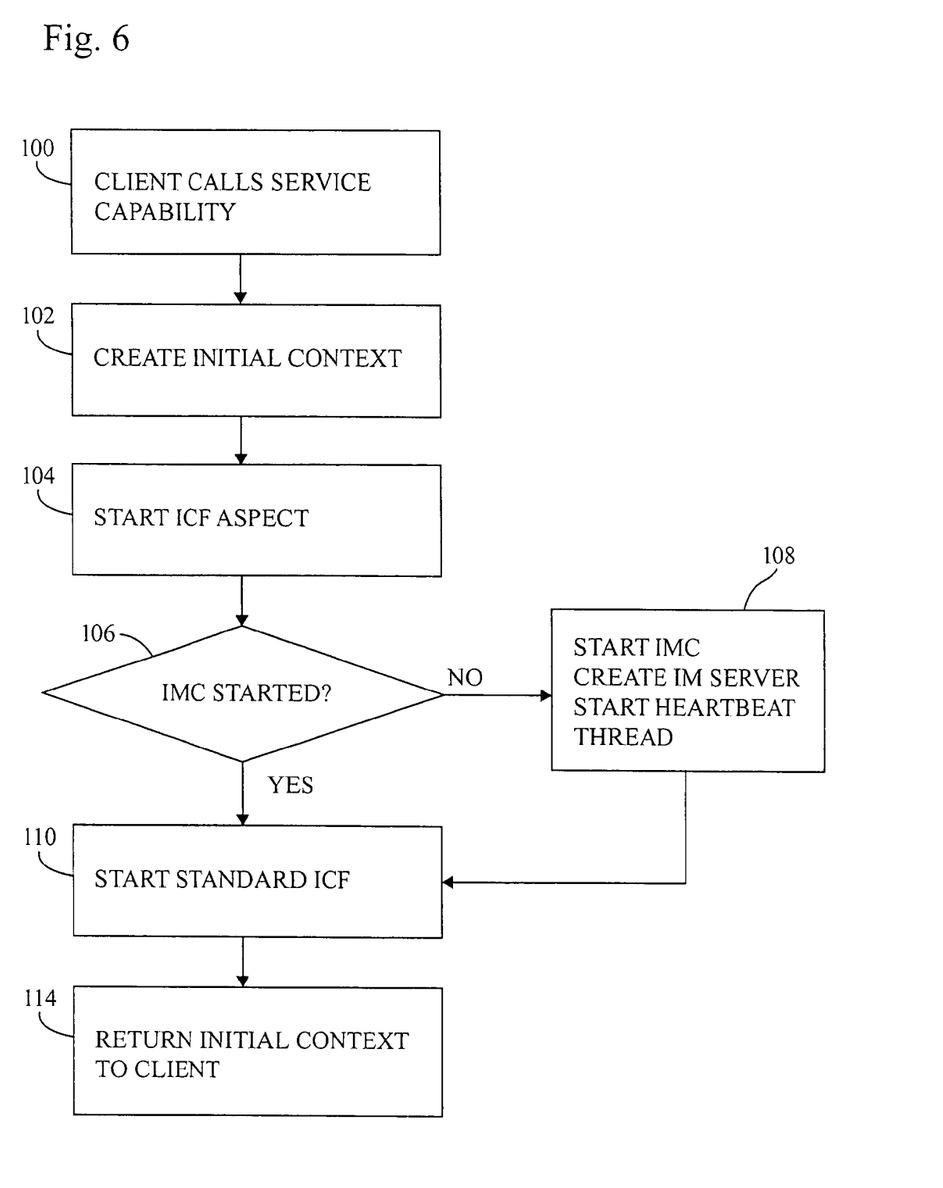
FIG. 6 is a flow diagram of initialisation steps according to another embodiment of the invention.

In a preferred transparent version of the initialisation steps shown in FIG. 6 the client 10 does not have to change the programming model to initialize the system and from a service provider's perspective, the system is foolproof such that the client side classes will be started every time the client attempts to use the service capabilities (step 100) running on the server 12. An example set of information flows that have been implemented for Java 2 Enterprise Edition clients to transparently start the server side classes exploits the InitialContextFactory (ICF) capability 51 of J2EE using an explicitly defined InitialContextFactory aspect 53 at step 104 that would be referenced in the creation of an InitialContext (step 102). At step 106 the ICF aspect merely starts the IMC 32 if not already implemented (step 108), does a lookup for the IM home, creates a IM server then starts a new heart beat thread as described above. It then calls the standard J2EE ICF implementation (step 110), which could be supplied with a SilverStream, iPlanet or BEA Weblogic application server or any other appropriate server.

In system terms, the client application calls the InitialContext 55 (comprising a directory for lookup of applications) with the ICF aspect 53 as a parameter. The ICF aspect 53 can check whether the IMC 32 is running, and if not it can start the IMC 32 with the appropriate method. The IMC 32 then accesses the InitialContext 55, again this time using the installed application server's ICF (i.e. the server implementation of the InitialContext access). Finally the same thread calls an InitialContext on the installed application servers ICF and passes the result at step 114 back to the client.

Once the system is initialised and running polling of the integrity manager server is performed to ensure that the client installation is kept up to date with the throttle back settings of the server. Referring once again to FIG. 4, once the IMC 32 has been initialized, the HBT 56 will poll the IM server object 36 with the appropriate method. This method not only notifies the server 12 that the client installation 10 is still running, but allows the IMC 32 to access throttleback settings and other server settings. The settings are returned the IMC 32 in the method call and are stored as a java.lang. Properties object of name value pairs. The settings also contain a HBT poll period setting that the HBT 56 can pick up and thus update and set its polling rate. If authentication is in place, the IM 62 can interrogate the calling thread to identify the calling application. In this way the server 12 can calculate specialized settings for that particular application, providing different service levels for different users.

As discussed above controlling of calling rates is achieved by intercepting the method call thread in the stub and if necessary delaying the thread for a pre-determined time before actually transmitting the message to the server dependent on delay data that can be static or dynamic.

As before, when a service is invoked the client application 14 accesses the service capability stub 50 by doing a lookup from the J2EE Initial Context. The lookup then downloads the service capability stub 50 to the client system 10. The stub 50 ensures that, when methods are called on it, it can delay the threads on the client installation 10 without impacting on the server 12. When a method call is made, the stub calls the Integrity Manager Stub Controller (IMSC) 54 with the method name and stub class type. The IMSC 54 then calculates the necessary thread delay for a method. It then makes the thread sleep for the thread delay period. The IMSC 54 can get the most up to date information on throttleback settings from the IMC 32.

The invention supports various methods of constraining the client when accessing the server 12 or service 16. IMS 36 sets the method call rates that are returned to the IMSC.

For example throttleback can be imposed on all methods of a specific service (X) 16. This is done by the IMS 36 setting the SERVICE_X_CALL_RATE value to a given rate or period value and the IMSC 32 ensuring all calls are delayed according to the rate. Alternatively throttleback can be imposed on a specific method (Y) of a service (X) 16. This is done by the IMS 36 setting the SERVICE_X_METHOD_Y_CALL_RATE value and the IMSC 32 ensuring all calls are delayed according to the rate or throttleback can be imposed on all methods on a server (W) 12 irrespective of which service 16 within the server they are on. This is done by the IMS 36 setting the SERVER_W_METHOD_CALL_RATE value and the IMSC 32 ensuring all calls are delayed according to the rate.

Further throttleback can be imposed on all methods of an installation where there may be more than one server 16. This is done by the IMS 36 setting the METHOD_CALL_RATE value and the IMSC 32 ensuring all calls are delayed according to the rate.

By a combination of all of the above, throttleback can be imposed on all methods of an installation where there may be more than one server. This is done by the IMS 36 setting the SERVER_W_SERVICE_X_METHOD_Y_CALL_RATE value and the IMSC 32 ensuring that calls are delayed according to the rate. For example an IMS rate setting of "SERVER_fore1.acme.com:1234_SERVICE_mail_METHOD_send CALL_R ATE=6000" will result in the client calling the send ( ) method on the mail service that runs on the server fore1.acme.com:1234 once every 6000 milliseconds.

Table 1 shows examples of the return properties received by the IMC when polling the IM.

TABLE 1

| Name | Description |
| --- | --- |
| HEARTBEAT_POLL_PERIOD | Delay between future heartbeats from the client in seconds. |
| METHOD_CALL_RATE | General delay in call rates for all non-specified service capabilities and methods in milliseconds. |
| HEARTBEAT_POLL_TIME | Current system time in milliseconds |
| CLIENT_VERSION | Client version for compatibility. |
| SERVICE_ULS1_METHOD_M1_CALL_RATE | Specific call rate for ULS1 service for method #1 in milliseconds. |
| SERVICE_ULS1_METHOD_M2_CALL_RATE | Specific call rate for ULS1 service for method #2 in milliseconds. |

The waiting algorithm can be set on the client 10 such that conditional clauses can be applied to the delay rates. The waiting algorithm used in the invention is such that client IMSC 32 calculates the waiting period based on time since last method was sent. This means if the calling rate of the application 14 is 1 call per 10000 ms and the METHOD_CALL_RATE as set by the IMS is 5000 ms then methods will not be delayed. However, if the calling rate of the application is 1 call per 5000 ms and the METHOD_CALL_RATE as set by the IMS is 10000 ms then the method will be delayed by 5000 ms. This can be implemented using an appropriate conditional clause.

Although the implementation developed for this invention uses a wait time derived directly from the rate value there is the ability for the IMS 36 to set a METHOD_DELAY_ALGORITHM that could relate to client 10 based mechanism such as a random "backoff" wait period.

In the case of a service capability becoming completely unavailable, or requiring no further calls, the IM 62 can be programmed to send complete throttleback settings to the IMC 32. The stub 50 will then intercept, rather than delay the thread as before, by setting a java.rmi.RemoteException with "COMPLETE_THROTTLEBACK" in the message body of the exception. In addition to the IM 62 sending complete throttleback settings it may also include the URL (Uniform Resource Locator) of an alternative server which can provide a replacement service capability. This allows the client to be rerouted to another instance of the platform.

Similarly, in the event that the server itself becomes unavailable, the IMC 32 is arranged to time out. At this point, the IMC will set all throttleback settings to blocked, and will immediately block all further method calls to components on the server 12. The IMC may be pre-programmed with (or alternatively it may have been notified periodically by the IMS of) the URLs of other available servers. As such, the application 52 can request of the IMC an alternative server to use. If full throttle back is applied to the client and traffic is still sent to the network server in breach of the request, then server side packet filters, server components and firewalls may be instructed to remove offending traffic.

The skilled reader will recognise that the invention is described with respect to Java systems but would be applicable to other distributed applications.

For example Common Object Request Broker Architecture (CORBA) implementations are built as follows. The IMS and services are developed in any language and installed on the server. The Application Programme Interface (API) allowing the programmer to access the module of these components is described in an Interface Definition Language (IDL) file. An IDL compiler Javasofts idlj tool) takes the IDL file and generates interface classes, client stubs, server skeletons (base classes) source code and so forth. The implementer edits the client stub source code such that an intercept call is made out to the IMSC when a method was called. All these components are compiled into bytecodes or binaries dependant upon the target systems. The IMSC can be implemented in a language that it compatible with the client. The client installation consists of the special client stubs, interface classes and IMSC components. The client application would then be written that would communicate with the stubs to access the service and IMS.

Remote Method Invocation (RMI) implementation is very similar to the CORBA example. The API is defined as a remote Java interface, a program such as RMI stub compiler (RMIC) is used to generate the stubs and skeletons source code. The stubs are then altered to make the specific call to an intercept method on the IMSC. Again these components are compiled into bytecodes. The client installation consists of the interface classes and IMSC components. The client application is then written to communicate with the stubs to access the service and IMS. The special stub is installed on the server. This special stub is downloaded when a call is made to the service running on the server. The client application is then written that communicates with the stubs to access the service and IMS as discussed above.

Accordingly, through Java RMI, stubs can be downloaded on a per usage basis such that they can be used to control access to the underlying service capability running on the server. In non Java RMI systems, the stubs would be downloaded one time as part of the Service Developer Kit (SDK) comprising development and service access capability control software on the client SLA agreement which would work in the same ways as the Java RMI stub in intercepting message calls.

Simple Object Access Protocol (SOAP) implementation is built as follows. SOAP is built around packaging method calls into XML documents and sending them normally using HTTP-POST messages to the server. Language dependent stubs operate in a similar manner to the distributed computing stubs 18 of FIG. 2 and enable the application developer to avoid all the issues of hand coding serialization of method calls. The language dependent stub intercepts a method call before the method call is serialized into XML elements and posted via HTTP to the server. The language dependent stubs are generated when the service is developed. Server companies such as BEA offer a tool that generates the stub and as before these can be altered by the implementer such that interceptions are made when a method is called.

Figure 7:
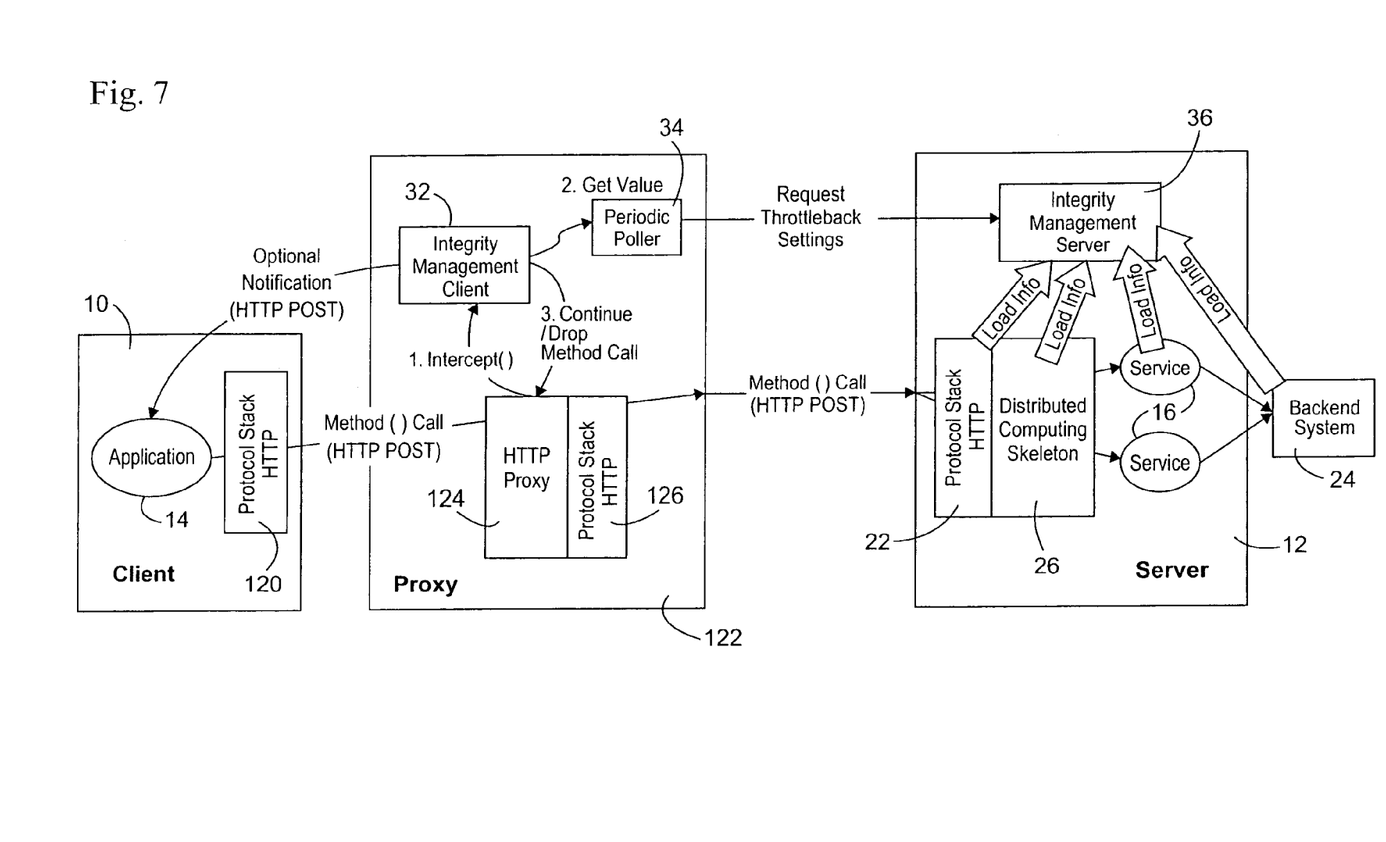
FIG. 7 shows an implementation of the invention using SOAP and a proxy.

Referring to FIG. 7, where in the SOAP implementation a pure HTTP interface is offered via HTTP Protocol stack 120 to the client application 14, the proxy 122 version can be used. This will allow raw method calls posted to the server to be intercepted by a proxy 124 carrying HTTP Protocol stack 126. Although the proxy could "wait" a message then forward it on this in many cases could lead to congestion on the proxy which could again suffer at the hands of malicious or badly written applications. Here, throttling back can be by notification back to the client application when they are sending too many method calls. If the application does not reduce the calling rate then method call "POST" messages can be dropped by the proxy thus protecting the server. This proxy approach can be applied equally in other implementations as appropriate.

This invention can further be applied in Java APIs for Integrated Networks (JAIN) by developing special client side libraries as part of APIs such as JAIN™ SIP, JAIN™ Call Control, JAIN™ MAP and JAIN™ SPA Mobility APIs. Key methods on server objects would be intercepted on the client side API.

Figure 8:
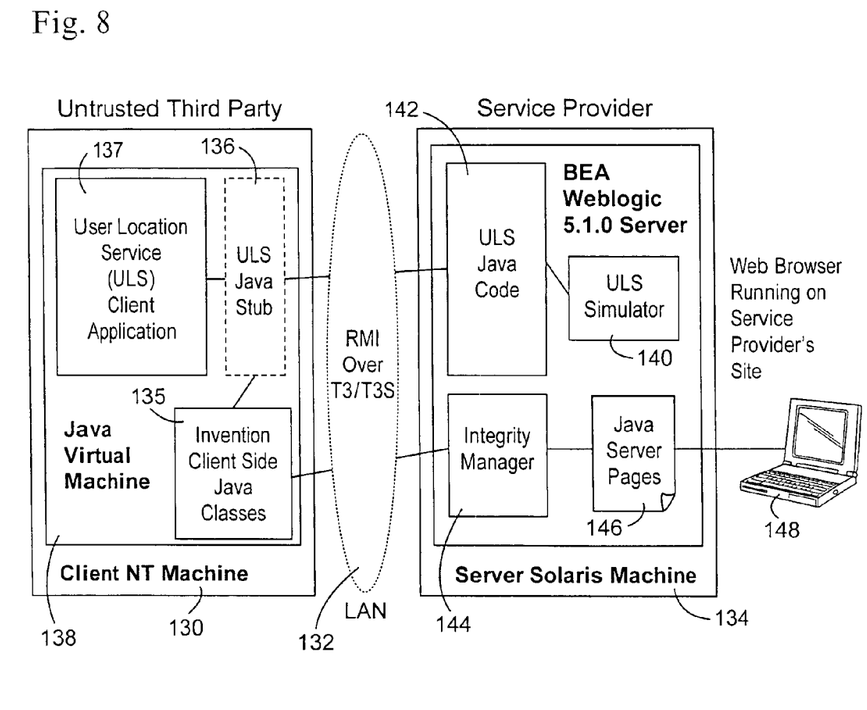
FIG. 8 shows a preferred implementation of the invention.

An example of one implementation is shown in FIG. 8 where a client machine 130 which can be a Windows™ NT machine, or any other appropriate PC, which includes a memory for storing software, computer reader code, and software modules and which communicates over a local area network (LAN) 132 with a server machine 134 which can be a Sun Server using Solaris or any other appropriate system such as a Unix/POSIX or Linux system. The computer readable code, software, and software modules can be stored on a computer readable storage medium such as a hard disk, CD-ROM, or the like. Where the client 130 represents an untrusted third party a user location request is sent to the service provider domain (server 134) at different intervals. Additional SDK classes 135 are installed on the client side 130 and a User Location Service (ULS) stub 136 is shown on the client 130 having been downloaded at run time. All client side codes run within a JAVA 1.3 virtual machine 138 which runs the ULS client application.

At the server 134 the user location 140, stub code 142 and integrity manager 144 are installed and running on a J2EE BEA weblogic server. Communication between the client 130 and server 134 uses RMI over BEA'S T3 protocol although other appropriate protocols can of course be used. The integrity manager 144 at the server is linked to JAVA server pages (dynamically generated html application) 146 allowing throttle back settings to be set on the fly by the server provider from a web browser 148.

In operation the application 137 accesses the server 134 using the Initial Context Factory aspect which starts up the client side classes 135. The server object 140 is accessed and the ULS stub 136 is downloaded to the client. The application then communicates with the ULS server via the stub 136. Each call to the stub determines whether a delay should be applied to the thread of execution. At the same time the IMC with the help of the heartbeat thread periodically downloads throttle back settings. Through control of the Java server pages (JSP) within the web browser which contain dynamically generated html content it is possible to set the duration between allowed server method calls such that client side classes 135 (ie client hosted implementation software) begin to throttle back the client 130. At this point client threads begin to be stopped for a predetermined period before they are allowed to continue to make the call to the server object 140.

It will be recognised that the invention can be implemented on any appropriate computer system or network and using any appropriate platform or protocol without departing from the inventive concept. In particular although the description is principally based on client and server provided across the Internet, this invention could be used within multi-tiered application servers i.e. between Web components such as Java Server Pages, Active Server Pages, Servlets and server components such as objects or Enterprise Java Beans. Likewise the mechanism could be implemented between one server component and another or between server components and resources such as database connection pools.

What is claimed is:

1. A computer-implemented method of controlling service requests to a first module acting as a server module from a second module acting as a client module, wherein:
   at the second module, service requests originated at the second module are intercepted and controlled prior to transmission of the service requests to the first module by queuing the service requests at the client and delaying transmission of the queued service requests as needed to smooth the frequency of requests transmitted to the first module,
   transmission of the service requests is controlled in accordance with control information received from the first module,
   a control intermediary in the second module periodically polling the first module to obtain updated control information.

2. The method according to claim 1, wherein the control information received from the first module is available locally at the second module from a store of the second module.

3. The method according to claim 1, wherein the service requests relate to at least one of a plurality of service capabilities provided by the first module, in which the transmission of a service request is controlled depending upon at least one service capability to which the request relates.

4. A computer-implemented method of controlling service requests to a first module acting as a server module from a second module acting as a client module, wherein:
   at the second module, service requests originated at the second module are intercepted and controlled prior to transmission of the service requests to the first module by queuing the service requests at the client and delaying transmission of the queued service requests as needed to smooth the frequency of requests transmitted to the first module,
   transmission of the service requests is controlled in accordance with control information received from the first module,
   the first module receiving from the second module in addition to the control information an address of a third module of the computer system, said third module being suitable for providing a service capability in the event that the transmission to the first module of service requests for the same service capability are unduly delayed.

5. The method according to claim 4, wherein the control information comprises a polling rate for the second module to use in obtaining further control information, and the polling rate is controlled to avoid flooding the first module with service requests.

6. The method according to claim 5, said polling comprising providing an identification of the second module and/or user, the method further comprising:
   at the first module, selecting control information to send to the second module based on the identification of the second module and/or user.

7. The method according to claim 1, further comprising:
   at the first module, identifying an unacceptable service request from a second module if the first module lacks an indication that a control intermediary is operating at the second module.

8. The method according to claim 7, further comprising:
at the first module, upon receiving an unacceptable service request the first module transmitting to the second module instructions for implementing a control intermediary at the second module.

9. The method according to claim 1, further comprising:
at the first module, upon receiving a first service request for a service capability, transmitting to the second module instructions for implementing control, at the second module, of further transmission of service requests to said first module.

10. A computer system including a non-transitory storage medium for storing software modules, said system comprising:
a first module acting as a server module; and
a second module acting as a client module arranged to originate and send service requests to the first module,
the second module comprising a control intermediary arranged to intercept and control the service requests prior to transmission of the service requests to the first module by queuing the service requests at the client and delaying transmission of the queued service requests as needed to smooth the frequency of requests transmitted to the first module,
wherein transmission of the service requests is controlled in accordance with control information received from the first module, and
wherein a control intermediary in the second module is configured to periodically poll the first module to obtain updated control information.

11. The system according to claim 10, wherein:
the control intermediary is arranged to control transmission of the service requests in accordance with control information received from the first module.

12. The system according to claim 11, wherein:
the intermediary is arranged to access the control information locally from a store of the second module.

13. The system according to claim 11, wherein the service requests relate to at least one of a plurality of service capabilities provided by the first module, and in which:
the intermediary is arranged to control transmission of a service request depending upon at least one service capability or capabilities to which the request relates.

14. The system according to claim 11, wherein:
the first module is arranged to send to the second module an address of a third module of the computer system in addition to the control information, said third module being suitable for providing a service capability in the event that the control intermediary inhibits transmission of service requests for the same service capability.

15. The system according to claim 1, wherein:
the first module is arranged to send updated control information to the second module upon receipt of polling by the second module.

16. The system according to claim 15, wherein the control information comprises a polling rate for the intermediary, and the polling rate is controlled to avoid flooding the first module with service requests.

17. The system according to claim 15, wherein:
the control intermediary is arranged to provide an identification of the second module and/or user when polling the first module; and
the first module is arranged to select control information to send to the second module based on identification of the second module and/or user.

18. The system according to claim 10, wherein:
the first module is arranged to identify an unacceptable service request from the second module if the first module lacks an indication that a control intermediary is operating at the second module.

19. The system according to claim 10, wherein:
the first module is arranged, upon receipt of an unacceptable service request, to transmit to the second module instructions for implementing a control intermediary at the second module.

20. The method according to claim 10, wherein:
the first module is arranged, upon receipt of a first service request for a service capability, to transmit to the second module instructions for implementing a control intermediary at the second module.

21. A computer including a non-transitory storage medium for storing software modules, and arranged to act as a first module of the system according to claim 10.

22. A computer including a non-transitory storage medium for storing software modules, and arranged to act as a second module of the system according to claim 10.

23. A non-transitory storage medium carrying computer readable code representing instructions for causing at least one or more computer to perform the method according to claim 1 when the instructions are executed by said at least one computer.

24. A computer system including a non-transitory storage medium for storing software modules, said system comprising:
a first module acting as a server module; and
a second module acting as a client module arranged to originate and send service requests to the first module,
the second module comprising a control intermediary arranged to intercept and control the service requests prior to transmission of the service requests to the first module by queuing the service requests at the client and delaying transmission of the queued service requests as needed to smooth the frequency of requests transmitted to the first module,
wherein transmission of the service requests is controlled in accordance with control information received from the first module,
the first module receiving from the second module in addition to the control information an address of a third module of the computer system, said third module being suitable for providing a service capability in the event that the transmission to the first module of service requests for the same service capability are unduly delayed.

* * * * *

UNITED STATES PATENT AND TRADEMARK OFFICE
CERTIFICATE OF CORRECTION

| | | |
|---|---|---|
| PATENT NO. | : 8,082,318 B2 | Page 1 of 1 |
| APPLICATION NO. | : 10/488777 | |
| DATED | : December 20, 2011 | |
| INVENTOR(S) | : Michael R. Hosking et al. | |

It is certified that error appears in the above-identified patent and that said Letters Patent is hereby corrected as shown below:

In the Claims

Column 11, line 51, claim 15, the claim reference numeral '1' should read --11--.

Signed and Sealed this
Twenty-first Day of October, 2014

Michelle K. Lee
*Deputy Director of the United States Patent and Trademark Office*